(12) United States Patent
Mason et al.

(10) Patent No.: US 8,506,868 B2
(45) Date of Patent: Aug. 13, 2013

(54) METHOD AND ARTICLES INCLUDING GLASS FLAKES IN RUBBER

(75) Inventors: David Walter Mason, St Helens (GB); Christopher Andrew Stevens, St Helens (GB)

(73) Assignee: NGF EUROPE Limited, St. Helens (GB)

(*) Notice: Subject to any disclaimer, the term of this patent is extended or adjusted under 35 U.S.C. 154(b) by 817 days.

(21) Appl. No.: 12/441,630

(22) PCT Filed: Sep. 28, 2007

(86) PCT No.: PCT/GB2007/003689
§ 371 (c)(1),
(2), (4) Date: Jan. 21, 2010

(87) PCT Pub. No.: WO2008/040942
PCT Pub. Date: Apr. 10, 2008

(65) Prior Publication Data
US 2010/0143621 A1 Jun. 10, 2010

(30) Foreign Application Priority Data
Oct. 5, 2006 (GB) .................................. 0619684.4

(51) Int. Cl.
*C08J 5/00* (2006.01)
(52) U.S. Cl.
USPC ....................... 264/331.13; 524/494; 524/552

(58) Field of Classification Search
USPC .............................. 524/494, 552; 264/331.13
See application file for complete search history.

(56) References Cited

U.S. PATENT DOCUMENTS

| 4,244,859 A | 1/1981 | Sugie et al. |
|---|---|---|
| 4,911,218 A | 3/1990 | Patitsas |
| 5,049,609 A | 9/1991 | Patitsas |
| 6,034,164 A | 3/2000 | Elspass et al. |
| 6,281,288 B1 | 8/2001 | Bickert et al. |
| 2003/0176560 A1 | 9/2003 | Mueller et al. |
| 2004/0063824 A1 | 4/2004 | Takagi et al. |
| 2005/0154083 A1 | 7/2005 | Hobbs et al. |

FOREIGN PATENT DOCUMENTS

| DE | 10 2005 041 423 A1 | 3/2006 |
|---|---|---|
| EP | 0 382 557 A1 | 8/1990 |
| EP | 0 940 448 A1 | 9/1999 |
| EP | 1 344 792 A1 | 9/2003 |
| EP | 1 500 678 A | 1/2005 |
| JP | 59-011344 A | 1/1984 |
| JP | 60-120868 A | 6/1986 |
| JP | 3-275774 A | 12/1991 |
| JP | 6-002325 A | 1/1994 |
| JP | 2000-080207 A | 3/2000 |
| JP | 2006-348164 A | 12/2006 |
| WO | WO 2007/025663 A1 | 3/2007 |

*Primary Examiner* — Michael C Miggins
(74) *Attorney, Agent, or Firm* — Hamre, Schumann, Mueller & Larson, P.C.

(57) ABSTRACT

Rubber articles such as tires, hoses and lining sheets comprising glass flakes exhibit improved fluid impermeability. Methods for the manufacture of such rubber articles are disclosed.

6 Claims, No Drawings

METHOD AND ARTICLES INCLUDING GLASS FLAKES IN RUBBER

The invention relates to rubber articles, particularly rubber articles suitable for use in fluid containment applications such as seals, tyres, hoses and liners.

BACKGROUND

Rubbers are frequently employed in fluid containment applications where a flexible yet relatively impermeable barrier is needed for fluid containment. For example, rubber may be used to keep air in a vehicle tyre, petrol in a vehicle fuel supply hose, or as a pipeline liner to prevent corrosive chemicals from attacking a steel pipeline.

In such applications, the flexibility of the rubber is a highly desirable feature, as is the impermeability of the rubber to the fluid that the rubber article is being used to contain.

EP 1 500 678 discloses a rubber composition for inner liners for tyres comprising a rubber selected from diene-based synthetic rubbers and natural rubber having a glass transition temperature of −55° C. or lower and an organized lamellar clay material. The rubber composition exhibits durability at low temperatures combined with resistance to permeation of air.

U.S. Pat. No. 4,911,218 and U.S. Pat. No. 5,049,609 each disclose a composition comprised of a polyvinylalcohol coating and at least one water-insoluble particulate organic or inorganic material having a plate like structure. Preferred particulate materials are flake mica and flake glass. Also disclosed is a rubber tyre having one of its surfaces coated with the composition.

U.S. Pat. No. 6,034,164 discloses a polymer nanocomposite composition having sufficiently low permeability to be used as a tyre inner liner prepared by blending a layered material with a metal processible non-ionic first polymer having a number average molecular weight greater than 50,000 g/mole and a second non-ionic polymer compatible with the first polymer and having a number average molecular weight less than that of the first polymer. Layered materials are disclosed as swellable layered structures such as clay minerals.

JP 2000-080207 discloses a process for forming a clay-rubber composite in which the clay mineral is uniformly dispersed in the rubber.

JP 61-120868 discloses a paint for repairing reinforced concrete with impermeability to gas by mixing 5 to 20% glass flake with a silicone rubber.

In the prior art, the provision of improved permeability for a rubber article used for containment requires either the application of a separate coating layer to the rubber article, or a process involving the swelling of a layered clay prior to its incorporation into the rubber article Hence it can be seen that there is a is a requirement for simplified methods for producing rubber articles used for fluid containment applications where the impermeability of the rubber article to the contained fluid is improved. There is also a need to provide such rubber articles without significant loss in the flexibility of the rubber article.

SUMMARY OF THE INVENTION

It has now been found that rubber articles of high flexibility and low permeability can be achieved by the incorporation of glass flakes into the rubber article prior to extrusion or moulding of the final article. The glass flake is admixed with the solid rubber and any other adjuncts prior to a shearing step to align the glass flakes, followed by cutting extrusion or moulding to form the final article, without the need for any additional process steps.

Without wishing to be bound by any theory, it is thought that the process of forming the rubber article may lead to substantial alignment of the glass flakes, leading to the glass flakes forming a maze-like or labyrinthine arrangement within the rubber matrix, hindering the migration of any permeating species which cannot pass though the glass flakes and so must divert around them through the rubber matrix.

Hence a first aspect of the invention provides a method for forming a rubber article comprising glass flakes, the method comprising the sequential steps of:

a) forming a mixture comprising rubber and glass flakes,
b) shearing the mixture to form a pre-form with aligned glass flakes,
c) forming the rubber article from the pre-form by cutting, extrusion or moulding.

A second aspect of the invention provides a rubber article obtained or obtainable by the method of the first aspect of the invention.

A third aspect of the invention provides a rubber article comprising a rubber matrix comprising glass flakes. Preferably the rubber article consists essentially of a rubber matrix comprising glass flakes.

DETAILED DESCRIPTION OF THE INVENTION

The preferred aspects of the invention as detailed hereinbelow apply to each of the first, second and third aspects of the invention.

By rubber article is meant an article of manufacture such as rubber sheet, tubing, liner and the like. Paints and coating layers formed from paints are not included in the term rubber article as used here. Nor are coatings formed from resins or other non-rubber polymers.

By rubber article is also meant an article of manufacture which substantially or essentially consists of a rubber matrix. Where the term rubber matrix is used below, it also applies to a rubber article comprising or consisting essentially of such a rubber matrix. The various aspects of the invention may be used with unfilled or lightly filled rubber matrices, but may also be used with highly filled rubber which comprises up to 300 phr of adjuncts than rubber. By phr is meant parts by weight of filler in the rubber matrix compared to 100 parts by weight of rubber in the rubber matrix. Typically the adjuncts will be substantially uniformly dispersed throughout the rubber matrix. In addition to the rubber itself, the rubber matrix will also typically comprise, as an adjunct, a vulcanizing or cross-linking agent in order to allow the rubber to be cured into a more durable elastic form after moulding or extrusion.

Particularly suitable rubber articles for the various aspects of the invention are articles in the form of a sheet or tube.

Further examples of articles preferably made according to the invention include a tyre, a hose, a tank liner (i.e. a lining sheet for protecting a metal storage tank from corrosion), a pipe liner (i.e. a tubular liner for insertion into a metal pipe or pipeline to prevent corrosion) or a sealing strip (such as used when sealing glass panes into frames in buildings or vehicles).

Suitable rubbers for use in the various aspects of the invention include natural rubber and synthetic diene rubbers. Preferred rubbers include: NR—natural rubber, EPDM—rubber prepared from ethylene-propylene-diene monomer, IIR—isobutene isoprene rubber (also known as "butyl"), BIIR—brominated isobutene isoprene rubber (also known as "bromobutyl"), CIIR—chlorinated isobutene isoprene rubber (also known as "chlorobutyl"), CR—chloroprene rubber, CSM—chlorosulphonated polyethylene rubber, HNBR—hydrogenated acrylonitrile-butadiene rubber, NBR—acrylonitrile-butadiene rubber (also known as "nitrile"), SBR—styrene butadiene rubber, FKM—fluororubber and fluorosilicone rubber and Q—silicone rubber. Mixtures of the above mentioned rubbers may also be employed. Particularly preferred rubbers for use with the invention are butyl, halobutyl, chloroprene and nitrile rubbers.

Typical adjuncts which are conventionally used in rubbers include: fillers such as carbon black, oils, clays, calcium carbonate such as calcite, vulcanization accelerators, cross-linking accelerators, antioxidants, scorch inhibitors, fatty acids such as stearic acid, metal oxides such as zinc oxide. Other conventional adjuncts may be employed as long as the object of the present invention is not adversely affected.

The glass flake used in the various aspects of the invention will suitably be used at a level of 5% or more by weight of the rubber matrix, preferably 6% or more, more preferably 7% or more, even more preferably 8% or more. Suitably, the glass flake is present as less than 30% by weight of the rubber matrix, preferably less than 25%, even more preferably less than 20%. This is to avoid the flexibility of the rubber matrix being jeopardised.

Suitably, the glass flake has a thickness of 10 µm or less, preferably 8 µm or less, more preferably 7 µm or less. Suitably the flake thickness is 0.1 µm or more, preferably 0.5 µm or more, more preferably 1 µm, even more preferably 3 µm or more to inhibit breakage of the flake during the mixing and calendering into the rubber matrix. The thickness of the glass flake may suitably be measured by optical microscopy.

Suitably, the mean diameter of the glass flake is 15 µm or more, preferably 40 µm or more, more preferably 140 µm or more. Even larger flakes are suitable such as with a mean diameter of 400 µm or more or even 500 µm or more. Preferably the glass flake has a mean diameter of 1700 µm or less, preferably 900 µm or less, otherwise the flexibility of the rubber matrix may be jeopardised. The mean diameter of the flakes is suitably measured using standard laboratory test sieves.

Suitably, at least 50% by weight, preferably at least 65% by weight of the glass flake has a diameter from 45 to 1700 µm.

Preferably, the ratio of mean diameter to thickness for the glass flake, is 100 to 1 or less, preferably 80 to 1 or less, more preferably 60 to 1 or less. The ratio of mean diameter to thickness is preferably greater than 3:1, more preferably greater than 5:1, even more preferably greater than 20:1.

The glass flakes in the pre-form are aligned. Suitably, the glass flakes are mutually aligned such that neighbouring flakes have their large faces substantially mutually parallel, i.e forming an angle of less than 20° with each other, preferably less than 10°, more preferably less then 5°. Preferably the glass flakes have a large face substantially aligned parallel to a surface of the pre-form which is formed by shearing the mix comprising rubber and glass flakes. Typically the pre-form is a sheet formed by milling or calendering, but it may be tubular in form.

By substantially aligned parallel to a surface of the pre-form, it is meant that the glass flakes are arranged within the pre-form such that for a substantial proportion of the flakes, say 50% or more by weight, preferably 70% or more, an axis contained in the largest surfaces of the flakes is substantially parallel to a surface of the pre-form, preferably the nearest surface of the pre-form. Even more preferably, for a substantial proportion of the flakes, say 50% or more by weight, preferably 70% or more, the largest surfaces of the flakes lie substantially parallel to the nearest surface of the pre-form. By substantially parallel is meant parallel within 20°, preferably within 10°. This may be measured by visible light stereo microscopy on sections cut from an article.

The glass used in the glass flake may be any suitable silica-based glass. For example, suitable glass types for use as flakes in the various aspects of the invention include C, E, R(K), S2(U) and AR glasses.

Preferred glasses for use in the various aspects of the invention are C glass and E glass. Typically, C glass comprises by weight, 65 to 72% $SiO_2$, 1 to 7% $Al_2O_3$, 4 to 11% of CaO, 0 to 5% of MgO, 0 to 8% of $B_2O_3$, 9 to 13% $Na_2O$ and/or $K_2O$ and 0 to 6% ZnO. E glass comprises by weight, 52 to 56% $SiO_2$, 12 to 16% $Al_2O_3$, 16 to 25% of CaO, 0 to 6% of MgO, 5 to 13% of $B_2O_3$ and 0 to 0.8% of $Na_2O$ and/or $K_2O$.

The glass flake may be used as such, or may be treated with a surface treatment to improve its compatibility and bonding with the rubber. Suitable surface treatment materials for the glass flake include epoxysilane, aminosilane, vinylsilane and acrylsilane. These may be used individually or in combination with each other to aid the bonding of the glass flake surface to the polymer matrix, improving the impermeability of the rubber article.

Suitable glass flake for the various aspects of the invention is available under the trade names Microglas™ and Glasflake™ as supplied by NGF Europe, St. Helens, England.

The method of the invention involves a mixing step, in which rubber is mixed with the glass flake and other adjuncts to form a substantially homogeneous mixture. At the mixing stage, although liquids may be present as adjuncts, the mix is essentially a dry mix, meaning that the rubber is in the form of solid particles or granules and the rubber is not in a substantially molten or fluid state, such that the mixture formed is in a dry or crumb state with air included in the mixture.

This is followed by a shearing step, involving shearing the mixture to form a pre-form, typically a sheet, wherein the glass flakes have a large face substantially aligned parallel to a surface of the pre-form. Typically this shearing step will be a calendering step, wherein the rubber mixture is heated by passage though a calendering machine (i.e. a multi-gap cylindrical roller mill). This process leads to the rubber mix being subject to a high shear state such that the calendered blend formed from the rubber mixture has all the ingredients substantially uniformly distributed throughout the calendered blend. The resulting calendered blend is substantially free of entrained gas. The resulting calendered blend will emerge from the calendering machine in the form of a pre-form which is a sheet whose thickness will be determined by the gap between the cylinders of the calendering machine. The resulting sheet may be subsequently used as such or as the starting material for a further extrusion or moulding process.

The shearing step may be a milling step, where the rubber is squeezed between two rolls to produce a coarse sheet as a pre-form. Preferably, if the shearing to align the flakes to a surface of the sheet is produced by a milling step, the mill gap will be sufficiently small to produce adequate shear to provide the required alignment.

The shearing step may also be carried out by high shear injection moulding or extrusion through a die, for instance to provide a tubular pre-form. Without wishing to be bound by theory, it is thought that the shear forces experienced by the glass flake during the high shear part of the process, such as milling, calendering, injection moulding or extrusion, lead to at least partial alignment of the glass flakes parallel to a surface of the pre-form, giving a consequent improvement in the impermeability of the resulting rubber matrix.

The resulting rubber, when it includes a vulcanizing agent or cross-linking agent as an adjunct, may be subjected to a curing or vulcanization step once it has been formed into its final shape to convert it into a more solid rather than a more fluid state.

The final shape of the rubber article may be formed by simply cutting the article from the pre-form, or may be formed by a low shear moulding, compression, compression moulding or extrusion step.

The invention will now be described further by reference to the following non-limiting example.

EXAMPLE

A chloroprene compound was used to prepare examples of a chemical tank lining sheet. The function of the lining sheet is to prevent a reactive chemical contacting a steel tank. In the experimental formulations detailed below, carbon black filler in the rubber matrix of the lining sheet was progressively replaced by glass flake. The formulations are expressed as parts by weight.

| | Parts by weight | | | |
|---|---|---|---|---|
| Chloroprene Neoprene W | 100 | 100 | 100 | 100 |
| Zinc Oxide | 5 | 5 | 5 | 5 |
| Magnesium Oxide | 4 | 4 | 4 | 4 |
| Ethylene thiourea accelerator | 0.5 | 0.5 | 0.5 | 0.5 |
| Stearic Acid | 0.5 | 0.5 | 0.5 | 0.5 |
| Paraphenylene diamine Antioxidant | 2 | 2 | 2 | 2 |
| Carbon Black Sterling SO-N550 | 50 | 45 | 40 | 35 |
| Glass Flake C-glass 5 μm thick-600 μm mean diameter | 0 | 5 | 10 | 15 |
| Glass flake, as weight % of rubber matrix | 0% | 3% | 6% | 9% |

No special techniques were used to incorporate the glass flake into the rubber mix. The rubber was in the form of solid slab. The other ingredients were in the form of fine powders. The glass flake was added to the mixing machine with the carbon black. The carbon black and glass were added first, to avoid degradation of the vulcanising agents from excessive temperature arising from high shear. When the rubber mix was removed from the mixing machine, there was no loose powder of unmixed glass flakes.

The mix was then formed into a sheet using a two-roll mill. A very tight nip gap was used to create high shear within the rubber to align the flakes. Several thin sheets were layered onto each other, and were used to form compression moulded vulcanised sheets having a thickness of about 2 mm.

The permeability to water of the resulting rubber sheet was assessed using a sealed cup method, in accordance with the general principles of ISO 2528 (1995) and ASTM D1653. A 2 mm thick cured sheet was prepared for each rubber sample. A 75 mm diameter disc was stamped from the sheet, and placed over the test cell (a hollow open-ended aluminium can with the sheet covering the open end of the can). An annular lid was tightly sealed over the rubber sheet, sealing the sheet to the can but leaving the centre of the sheet free to the environment. 50 ml of water was injected into the cell through a separate injection port which was subsequently sealed. The cell was weighed, and then placed in an oven at 60° C., oriented with the sheet downwards so that the water was lying in contact with and over the inside of the horizontal rubber sheet. The cell was supported on the annular lid such that the hot air in the oven could circulate past the rubber sheet. The samples were removed from the oven each day, allowed to cool, and weighed. The steady weight loss per day over 5 days was used to calculate the Water Vapour Transmission Rate (W.V.T.R.). The mean results from three samples for each compound were:

| Carbon Black phr | Glass Flake phr | Glass Flake weight % | W.V.T.R. g/m$^2$/day |
|---|---|---|---|
| 50 | 0 | 0 | 25.4 |
| 45 | 5 | 3 | 30.8 |
| 40 | 10 | 6 | 9.9 |
| 35 | 15 | 9 | 3.2 |

It can be seen from these results that at levels greater than 3% by weight of the glass flake, a considerable reduction in W.V.T.R. is obtained. The chemical resistance, abrasion resistance, flexibility and adhesive potential of the rubber are maintained.

The invention claimed is:

1. A method for forming a rubber article comprising glass flakes, the method comprising the sequential steps of:
   a) forming a mixture comprising rubber and glass flakes,
   b) shearing the mixture to form a pre-form with aligned glass flakes,
   c) forming the rubber article from the pre-form by cutting, extrusion or moulding.

2. A method according to claim 1 wherein the mixture comprises from 5 to 30% by weight of glass flakes.

3. A method according to claim 1 wherein the glass flakes have a mean thickness from 0.1 to 10 μm.

4. A method according to claim 1 wherein the glass flakes have a mean diameter from 15 to 1700 μm.

5. A method according to claim 1 wherein the rubber is selected from the group consisting of natural rubber, ethylene-propylene-diene monomer rubber, isobutene isoprene rubber, brominated isobutene isoprene rubber, chlorinated isobutene isoprene rubber, chloroprene rubber, chlorosulphonated polyethylene rubber, hydrogenated acrylonitrile-butadiene rubber, acrylonitrile-butadiene rubber, styrene butadiene rubber, fluororubber, fluorosilicone rubber, silicone rubber and mixtures thereof.

6. A method according to claim 1 wherein the mixture comprises a vulcanizing or cross-linking agent, the method comprising the further sequential step (d) of curing the rubber article.

* * * * *

UNITED STATES PATENT AND TRADEMARK OFFICE
CERTIFICATE OF CORRECTION

PATENT NO. : 8,506,868 B2
APPLICATION NO. : 12/441630
DATED : August 13, 2013
INVENTOR(S) : Mason et al.

It is certified that error appears in the above-identified patent and that said Letters Patent is hereby corrected as shown below:

On the Title Page

Item 56, column 2, under "Foreign Patent Documents", line 7, delete "60-120868" and insert --61-120868--.

Item 57, column 2, under "Abstract", line 1, delete "tires," and insert --tyres--.

In the Specification

Column 3, line 51, delete "then" and insert --than--.

Column 4, line 11, after "9 to 13%" insert --of--.

Signed and Sealed this
Twenty-sixth Day of November, 2013

Margaret A. Focarino
*Commissioner for Patents of the United States Patent and Trademark Office*